United States Patent
Rizzo et al.

(10) Patent No.: US 9,566,845 B2
(45) Date of Patent: Feb. 14, 2017

(54) ONE-WAY EXHAUST VENT

(71) Applicant: AXIOM GROUP INC., Aurora (CA)

(72) Inventors: Perry Rizzo, Aurora (CA); Rocco DiSerio, Toronto (CA); Herbert Anton Jahn, Toronto (CA)

(73) Assignee: AXIOM GROUP INC., Aurora (CA)

( * ) Notice: Subject to any disclaimer, the term of this patent is extended or adjusted under 35 U.S.C. 154(b) by 319 days.

(21) Appl. No.: 14/189,695

(22) Filed: Feb. 25, 2014

(65) Prior Publication Data

US 2014/0242897 A1    Aug. 28, 2014

Related U.S. Application Data

(60) Provisional application No. 61/768,738, filed on Feb. 25, 2013.

(51) Int. Cl.
 *B60H 1/24* (2006.01)
 *B60H 1/34* (2006.01)
 *F24F 13/08* (2006.01)
 *F24F 13/10* (2006.01)

(52) U.S. Cl.
 CPC .................................. *B60H 1/249* (2013.01)

(58) Field of Classification Search
 None
 See application file for complete search history.

(56) References Cited

U.S. PATENT DOCUMENTS

| | | | | |
|---|---|---|---|---|
| 4,683,913 A * | 8/1987 | Hoffman | ............ | B60H 1/00685 137/625.4 |
| 5,085,132 A * | 2/1992 | Ikeda | ............ | B60H 1/249 454/158 |
| 5,167,574 A * | 12/1992 | Ikeda | ............ | B60H 1/00664 137/512.1 |
| 5,492,505 A * | 2/1996 | Bell | ............ | B60H 1/249 137/855 |
| 5,564,979 A * | 10/1996 | Sumiya | ............ | B60H 1/00685 454/121 |
| 6,026,852 A * | 2/2000 | Barton | ............ | B29C 45/0062 137/512.1 |
| 6,357,473 B1 * | 3/2002 | Porter | ............ | B60H 1/249 137/512.15 |
| 6,648,749 B2 * | 11/2003 | Hayashi | ............ | B60H 1/249 454/162 |
| 2001/0046838 A1 * | 11/2001 | Hertel | ............ | F24F 13/1406 454/259 |

(Continued)

*Primary Examiner* — Gregory Huson
*Assistant Examiner* — Eric Gorman
(74) *Attorney, Agent, or Firm* — Perry + Currier Inc.

(57) ABSTRACT

A one-way vent for installation in a panel aperture is described. The vent includes a frame made of a first material, and valve and seal members both made of a second material, which has a lower stiffness than the first material. The frame includes an outer wall for engaging a perimeter of the aperture, and a valve seat extending inwardly from the outer wall. The valve seat defines an opening through the frame. The valve member includes a flap support fixed against a portion of the valve seat, and a valve flap flexibly coupled to the flap support. The valve flap is moveable between a closed position resting on the valve seat to cover the opening, and an open position elevated from the valve seat to uncover the opening. The seal member is fixed against the outer wall of the frame and extends outwardly from the outer wall.

10 Claims, 14 Drawing Sheets

(56) References Cited

U.S. PATENT DOCUMENTS

| | | | | |
|---|---|---|---|---|
| 2002/0148507 | A1* | 10/2002 | Porter | B60H 1/249 137/512.15 |
| 2005/0227607 | A1* | 10/2005 | Stevenson | B60H 1/249 454/164 |
| 2006/0199528 | A1* | 9/2006 | Rivera | B60H 1/249 454/359 |
| 2008/0200109 | A1* | 8/2008 | Valencia | B60H 1/249 454/70 |
| 2008/0268763 | A1* | 10/2008 | Dippel | B60H 1/249 454/152 |
| 2008/0305732 | A1* | 12/2008 | Dippel | B29C 45/0017 454/155 |
| 2009/0068940 | A1* | 3/2009 | Bloemeling | B60H 1/249 454/162 |
| 2010/0112924 | A1* | 5/2010 | Alexander | B60H 1/008 454/70 |
| 2011/0230129 | A1* | 9/2011 | Weber | B60H 1/249 454/162 |
| 2013/0072101 | A1* | 3/2013 | Marleau, Jr. | B60H 1/249 454/143 |
| 2014/0199933 | A1* | 7/2014 | Wissmueller | B60H 1/249 454/162 |
| 2016/0121692 | A1* | 5/2016 | Porter | B60H 1/249 454/165 |

* cited by examiner

ONE-WAY EXHAUST VENT

CROSS-REFERENCE TO RELATED APPLICATION

This application claims the benefit of U.S. Patent Application No. 61/768,738 filed on Feb. 25, 2013, with the U.S Patent and Trademark Office, the disclosure of which is incorporated in its entirety herein by reference.

FIELD

The specification relates to a plastic ventilation component.

BACKGROUND

Automobiles and other vehicles, and indeed many other structures with enclosed spaces, include ventilation systems that move conditioned air into the enclosed space. These structures generally also include vents that allow air to exit the enclosed space. Such vents may be expected to satisfy many, sometimes conflicting, conditions such as a low cost of production and the ability to withstand repeated exposure to the elements. Currently, such vents often rely on metals and other materials that corrode over time due to exposure. Reducing reliance on those materials presents further challenges however, as substitutes such as plastics may be more difficult to fabricate while still meeting the above conditions.

BRIEF DESCRIPTIONS OF THE DRAWINGS

Embodiments are described with reference to the following figures, in which.

DETAILED DESCRIPTION OF THE EMBODIMENTS

Figure 1:
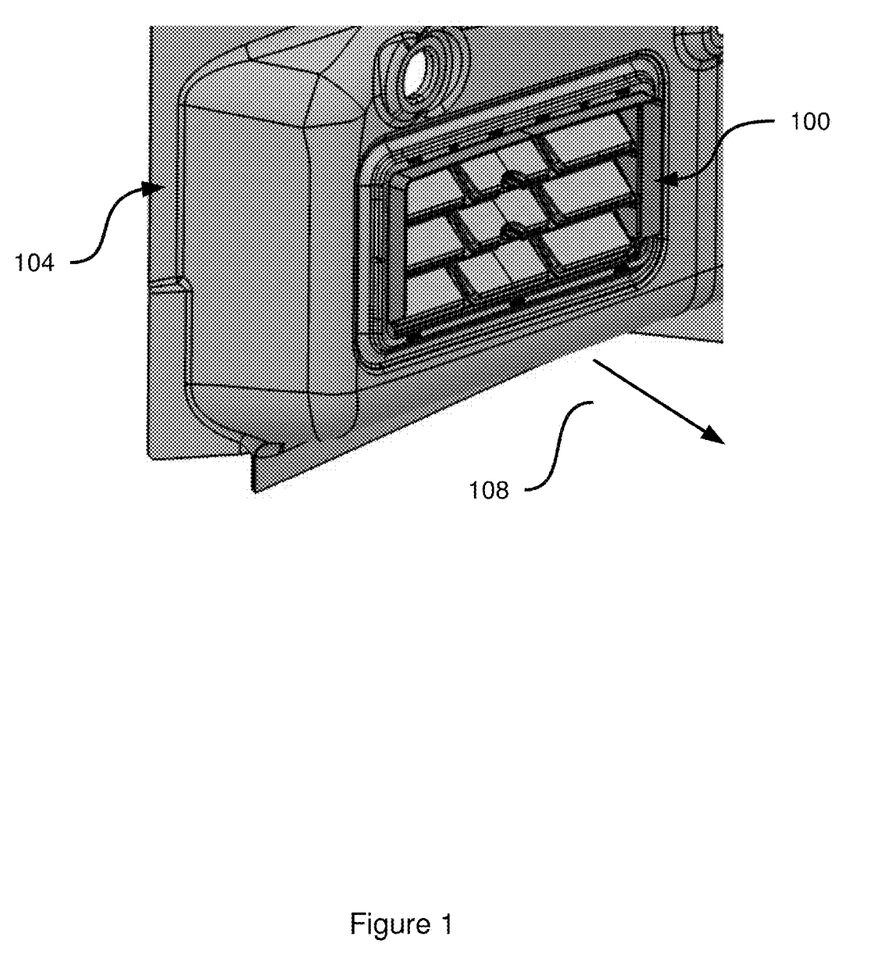
FIG. 1 depicts a one-way vent installed in a panel, according to a non-limiting embodiment.

FIG. 1 depicts a one-way vent 100 mounted in a panel 104. In the present embodiment, panel 104 is a body panel of an automobile or other vehicle. In other embodiments, however, vent 100 can be mounted in various types of panels, including body panels of a variety of machinery, buildings and the like. In general, vent 100 can be used to provide ventilation to any enclosed space requiring ventilation.

More specifically, vent 100 is one-way in that air is permitted to flow out of the vehicle, in the direction indicated by arrow 108. Flow in the opposite direction, into the vehicle, is substantially prevented by vent 100 (that is, reverse flow may not be perfectly prevented, but represents less than about 10% of forward flow).

Figure 2:
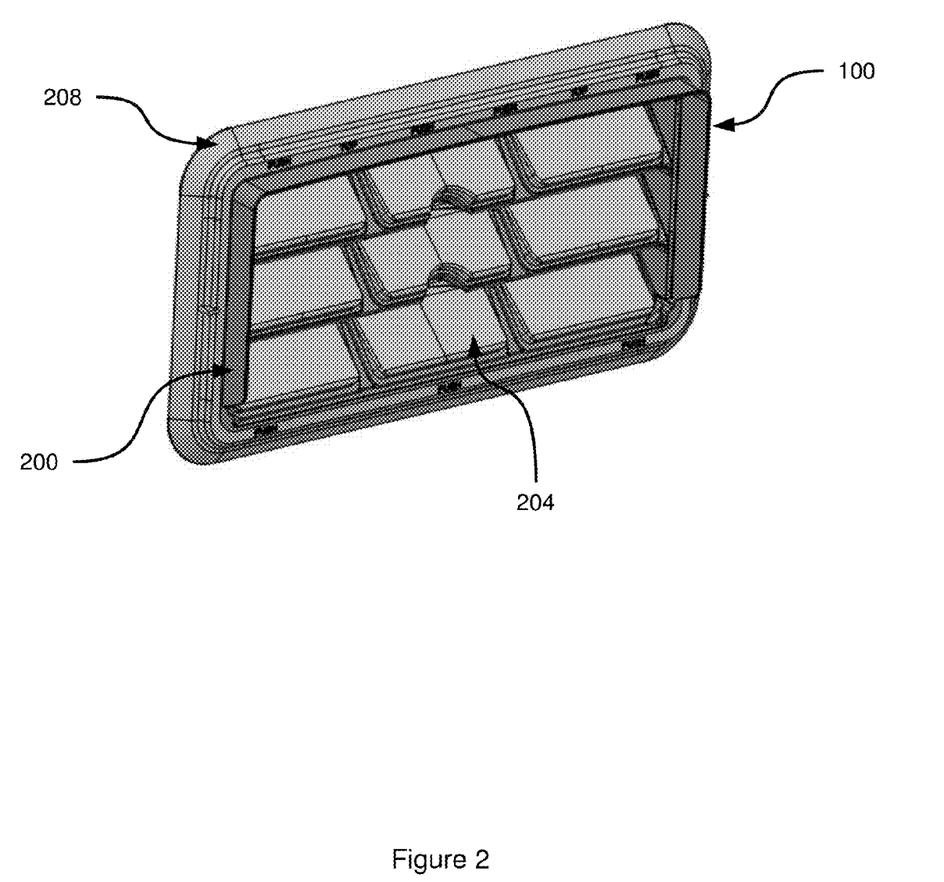
FIG. 2 depicts the vent of FIG. 1 in isolation.

Referring now to FIG. 2, vent 100 is shown in isolation. Vent 100 includes a frame 200, one or more valve members 204, and a seal member 208, each of which will be described in greater detail below. In brief, frame 200 provides a relatively (compared to valve member 204 and seal member 208) rigid structure that fits into an aperture in panel 104. Valve member 204 provides a relatively flexible (compared to frame 200) structure for opening and closing channels through vent 100 to allow air to escape the vehicle. Finally, seal member 208 provides a relatively flexible (compared to frame 200) structure for preventing air, water and other fluids from entering the vehicle around the edges of frame 200. Frame 200 is made of a first material, while valve member 204 and seal member 208 are made of a second material. Both the first and second materials are plastics in the present embodiment, although the first material has a greater stiffness than the second material. That is, the first material exhibits less deformation in response to stress than the second material. The first and second materials are non-bonding; that is, they do not chemically bond with each other either in normal use (that is, a range of outdoor temperatures and humidities) or in injection moulding equipment.

Figure 3:
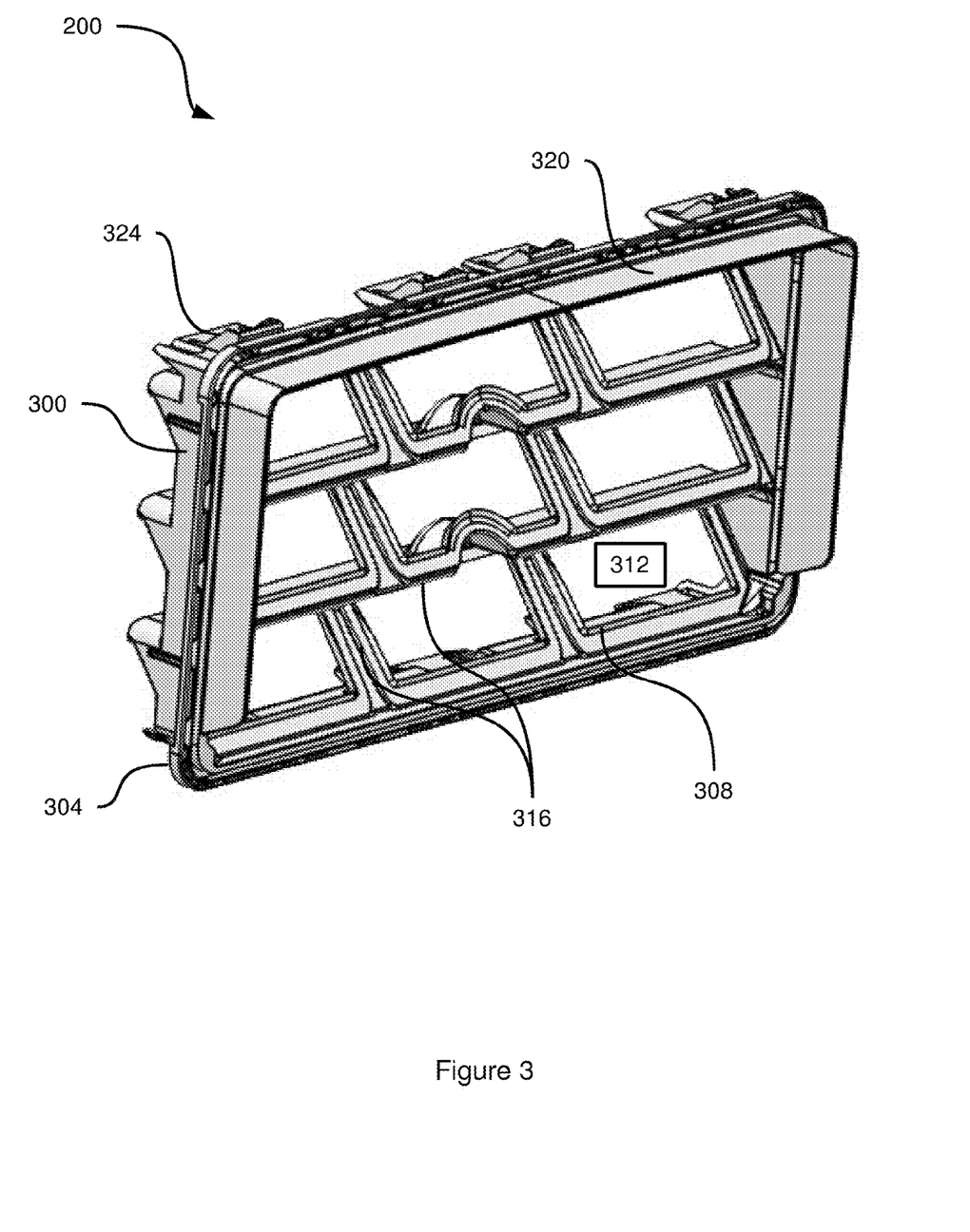
FIG. 3 depicts an isometric view of a frame of the vent of FIG. 1, according to a non-limiting embodiment.
Figure 4:
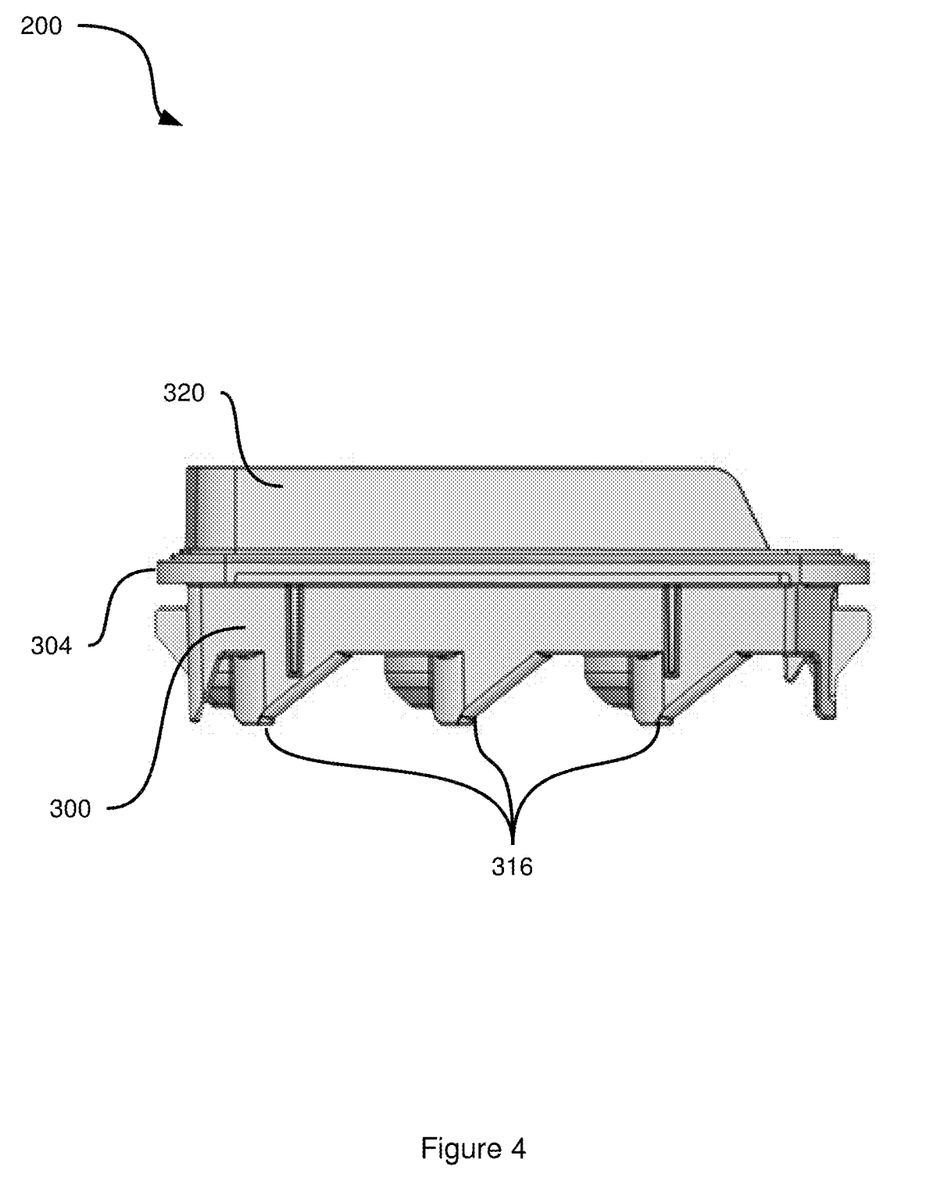
FIG. 4 depicts a side elevation view of the frame of FIG. 3, according to a non-limiting embodiment.

Turning now to FIG. 3, frame 200 will be described in greater detail. Frame 200 includes an outer wall 300 for engaging a perimeter of an aperture in panel 104. The nature of the engagement between outer wall 300 and the aperture's perimeter is not particularly limited. For example, outer wall 300 can be dimensioned to press fit into the aperture, or can include other attachment mechanisms for engaging with the perimeter of the aperture, as will be discussed below. In general, at least part of outer wall 300 enters into physical contact with the aperture's perimeter during installation. Outer wall 300 can include a flange 304 extending outwardly, to prevent frame 200 from completely passing through the aperture during installation. Referring briefly to FIG. 4, a side view of frame 200 is provided in which outer wall 300 and flange 304 are clearly visible.

Returning to FIG. 3, frame 200 also includes a valve seat 308 extending inwardly (that is, towards the center of frame 200) from outer wall 300. Valve seat 308 provides a surface on which a valve flap (to be discussed further below) can rest, and also defines an opening 312 through frame 200. Opening 312 allows air to flow across frame 200, from the interior of the vehicle to the exterior. In the present embodiment, a total of nine valve seats 308 are included in frame 200, and thus a total of nine openings 312 are defined through frame 200. The valve seats 308 extend inwardly from a plurality of ribs 316 connected to outer wall 300 and arranged in a grid pattern. Valve seats 308 are the front (that is, facing the exterior of panel 104 when vent 100 is installed) surfaces of ribs 316. Some of ribs 316 are also visible in FIG. 4.

The number of valve seats 308 and corresponding openings 312 are not particularly limited, and can vary from a lower bound of one to any suitable upper bound. Greater or smaller numbers of valve seats 308 and openings 312 can be obtained by varying the number and spacing of ribs 316.

Frame 200 can also include a rain shield 320 projecting forwards from outer wall 300. Rain shield 320, however, can be omitted in some embodiments. When rain shield 320 is included, it need not project from the entirety of outer wall 300. For example, as seen in FIG. 3, rain shield 320 extends only from three of the four sides of outer wall 300. This reduces the volume of material required to fabricate rain shield 320, and reduces the accumulation of water or other fluids near the bottom of frame 200.

As mentioned earlier, various attachment mechanisms can be used to fix frame 200 to panel 104. In some embodiments, outer wall 300 can be press fit into the aperture. In the present embodiment, however, outer wall 300 carries one or more fasteners which engage with the aperture's perimeter. In particular, outer wall 300 includes a plurality of flexible clips 324 which deform inwardly when frame 200 is pressed into panel 104, and rebound outwardly when they have passed through the aperture in panel 104, thus preventing frame 200 from being removed from the aperture.

Figure 5:
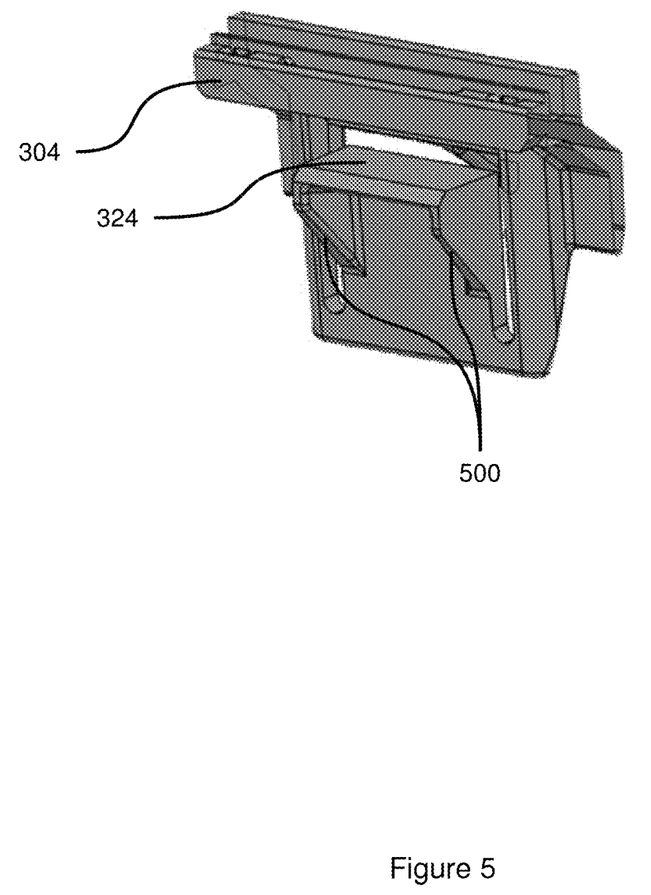
FIG. 5 depicts a detail view of a clip on the frame of FIG. 3, according to a non-limiting embodiment.

FIG. 5 shows a partial view of frame 200, in which a single clip 324 is visible, along with a portion of flange 304. As seen in FIG. 5, clip 324 is coupled to outer wall 300 at only one side while being cut away from outer wall 300 on the other three sides. As a result, clip 324 is free to deform inwards when pressure is applied to ridges 500. The operation of clips 324 will be described in greater detail below, in connection with the complete vent 100.

Figure 6:
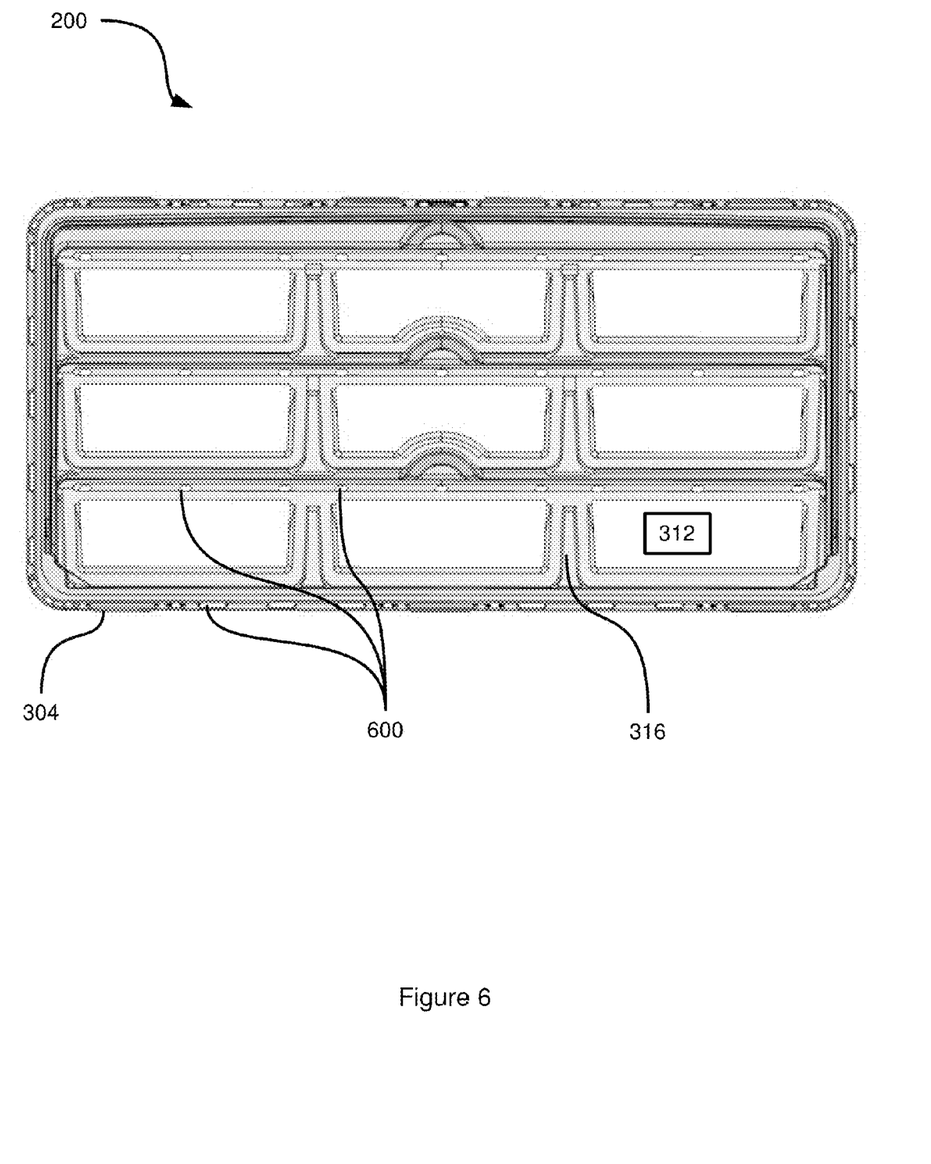
FIG. 6 depicts a front elevation view of the frame of FIG. 3, according to a non-limiting embodiment.

Frame 200 can include additional structural features to aid in attaching to valve member 204 and seal member 208. In particular, referring to FIG. 6, a plurality of anchor holes 600 are provided through ribs 316 and flange 304. Additional convolutions may also be provided in the surface of frame 200 to aid in attaching frame 200 to the other components of vent 100. Examples of such convolutions, and of the use of anchor holes 600, will be provided below in connection with a detailed description of valve member 204 and seal member 208.

Before describing valve member 204 and seal member 208 in detail, the manufacturing of vent 100 will be introduced. In the present embodiment, vent 100 is produced by injection moulding. More specifically, vent 100 is made using a two-shot injection moulding process, in which the first shot (that is, the first of two deliveries of plastic to the mould) produces frame 200. Frame 200 is thus a one-piece component, made entirely from the above-mentioned first material.

Once frame 200 has been produced, valve member 204 and seal member 208 are both produced in the second injection shot, of the second material mentioned above. Of particular note, frame 200 is present in the mould used for the second shot, and thus valve member 204 and seal member 208 are both injection moulded over frame 200 in a single operation. As noted above, the first and second materials are non-bonding, and thus the attachments between frame 200, valve member 204 and seal member 208 are mechanical in nature, rather than chemical.

Figure 7:
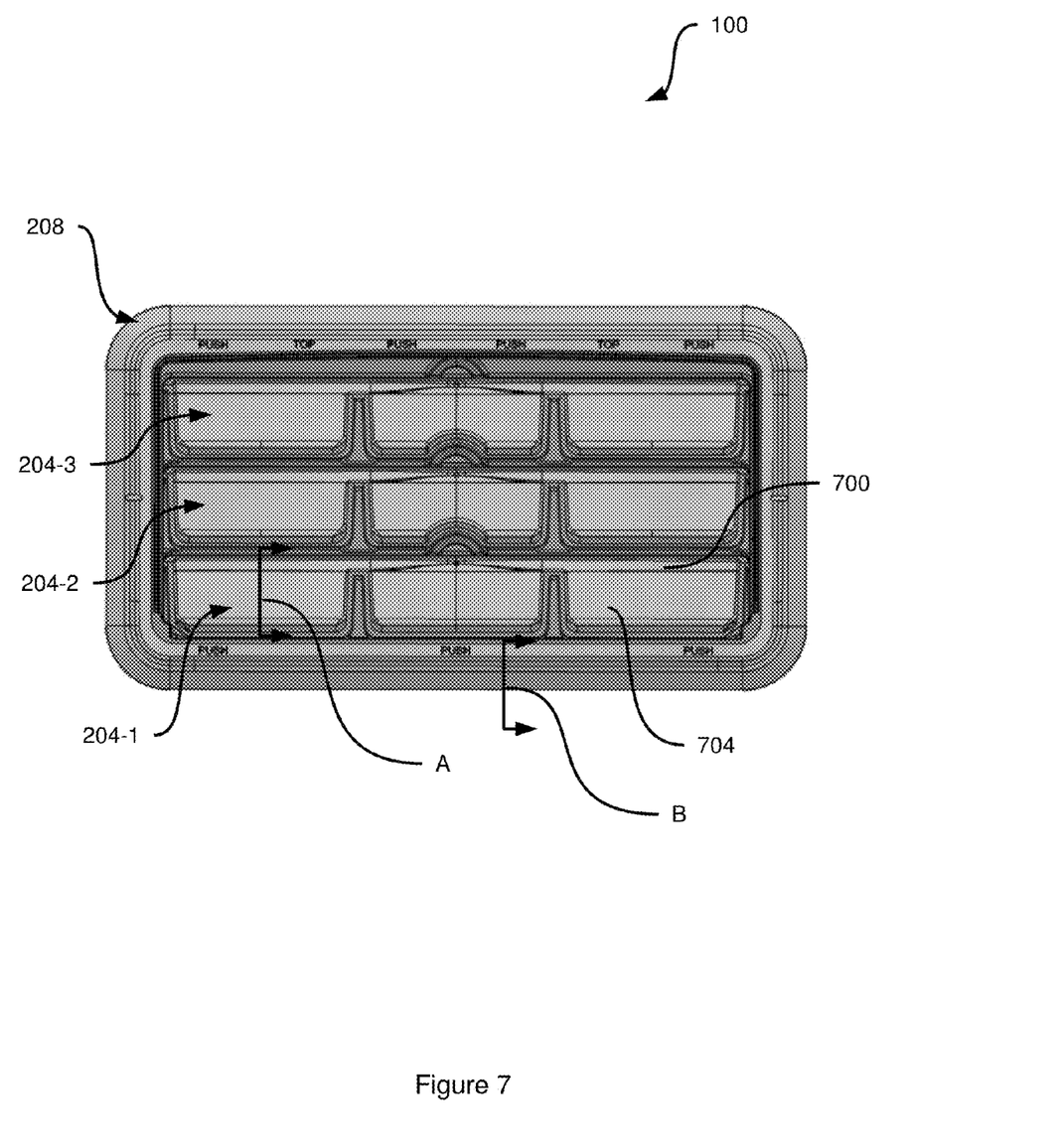
FIG. 7 depicts a front elevation view of the vent of FIG. 1, according to a non-limiting embodiment.

Referring now to FIG. 7, vent 100 is depicted after the over-moulding of valve member 204 and seal member 208. As seen in FIG. 7, there are in fact three physically distinct one-piece valve members 204-1, 204-2 and 204-3, although all three valve members 204 are moulded in the same single operation. In other embodiments, the three valve members 204 can be a single piece of material, in which case they would be referred to as a single valve member 204. In still other embodiments, valve member 204-1 itself can be subdivided into three individual valve members (one for each underlying opening 312 in frame 200). In other words, the structural elements described below can be recombined in a variety of separate valve members in any suitable way (to suit injection moulding equipment, for example), so long as a valve is provided for each opening 312. The structural elements of valve member 204-1 will be described, with the understanding that those elements are repeated in valve members 204-2 and 204-3.

Valve member 204-1 includes a flap support 700 fixed against a portion of valve seats 308. In the present embodiment, one flap supports 700 is included, fixed against portions of three valve seats 308. As mentioned above, valve member 204-1 can be subdivided into three valve members; this could be accomplished by breaking flap support 700 into three separate flap supports, one for each valve seat 308 traversed by valve member 204-1.

Flap support 700 is fixed to valve seats 308 by mechanical attachments. In the present embodiment, such attachments are provided by ingress of the material forming flap support 700 into anchor holes 600 during the second shot of injection. Valve member 204-1 also includes one or more valve flaps 704 (three, in the present embodiment) flexibly coupled to flap support 700 and moveable between a closed position resting on valve seats 308 to cover openings 312, and an open position elevated from valve seats 308 to uncover openings 312. Thus, between valve members 204-1, 204-2 and 204-3, a total of nine valve flaps 704 are provided, corresponding to the nine openings 312 in frame 200.

Figure 8:
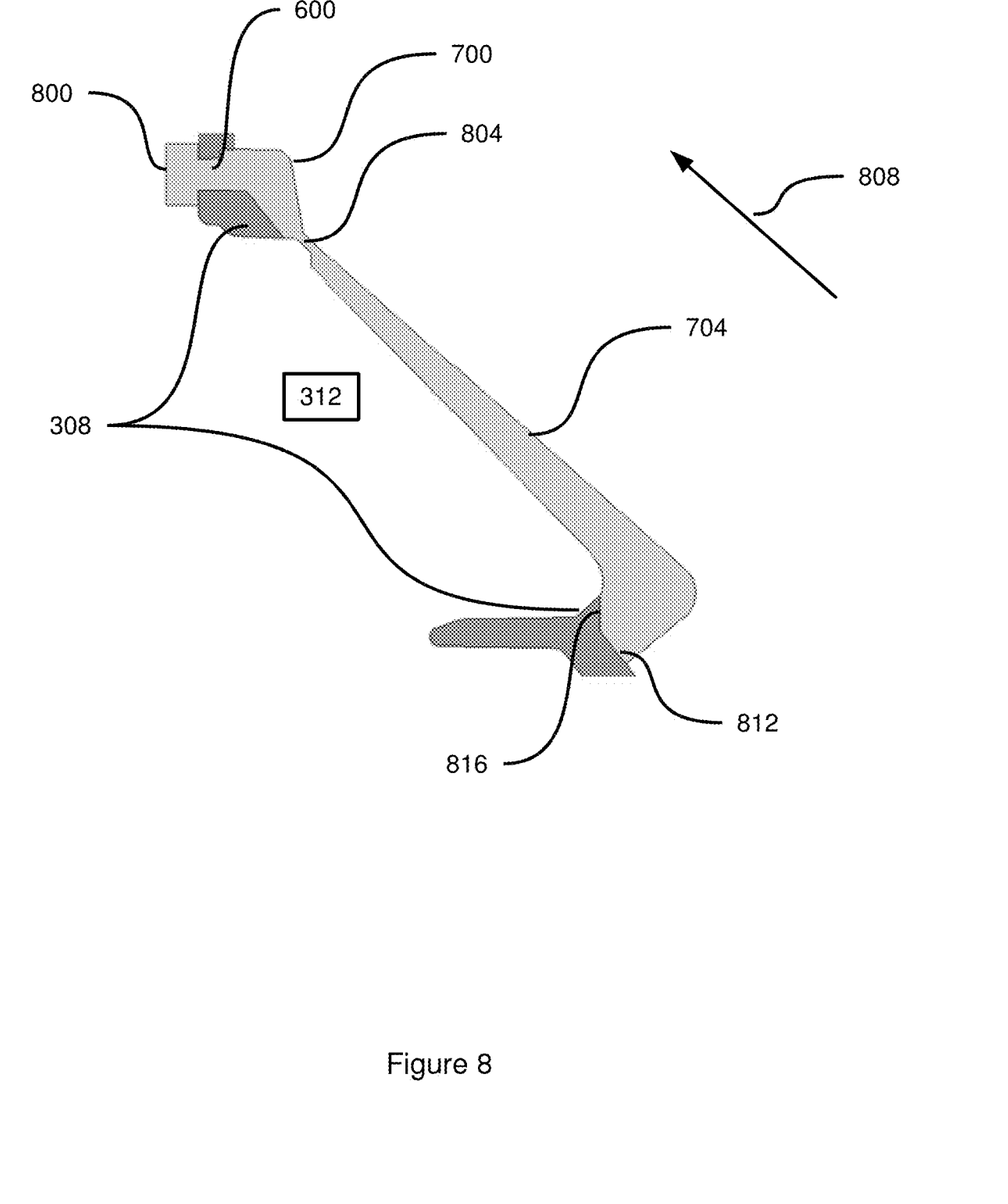
FIG. 8 depicts a partial cross section of a vent flap taken from FIG. 7, according to a non-limiting embodiment.

FIG. 8 shows a partial cross section of vent 100 taken at line "A" in FIG. 7. Flap support 700 is shown fixed against valve seat 308 by way of an anchor 800 that extends through anchor hole 600. Flap 704 is coupled to flap support 700 at a living hinge 804. Living hinge 804 is part of the same single piece of material as flap support 700 and flap 704, but is thinner than flap support 700 or flap 704, and thus is the first portion of valve member 204-1 to deform when pressure (e.g. air pressure from inside the vehicle) is applied to flap 704.

Figure 9:
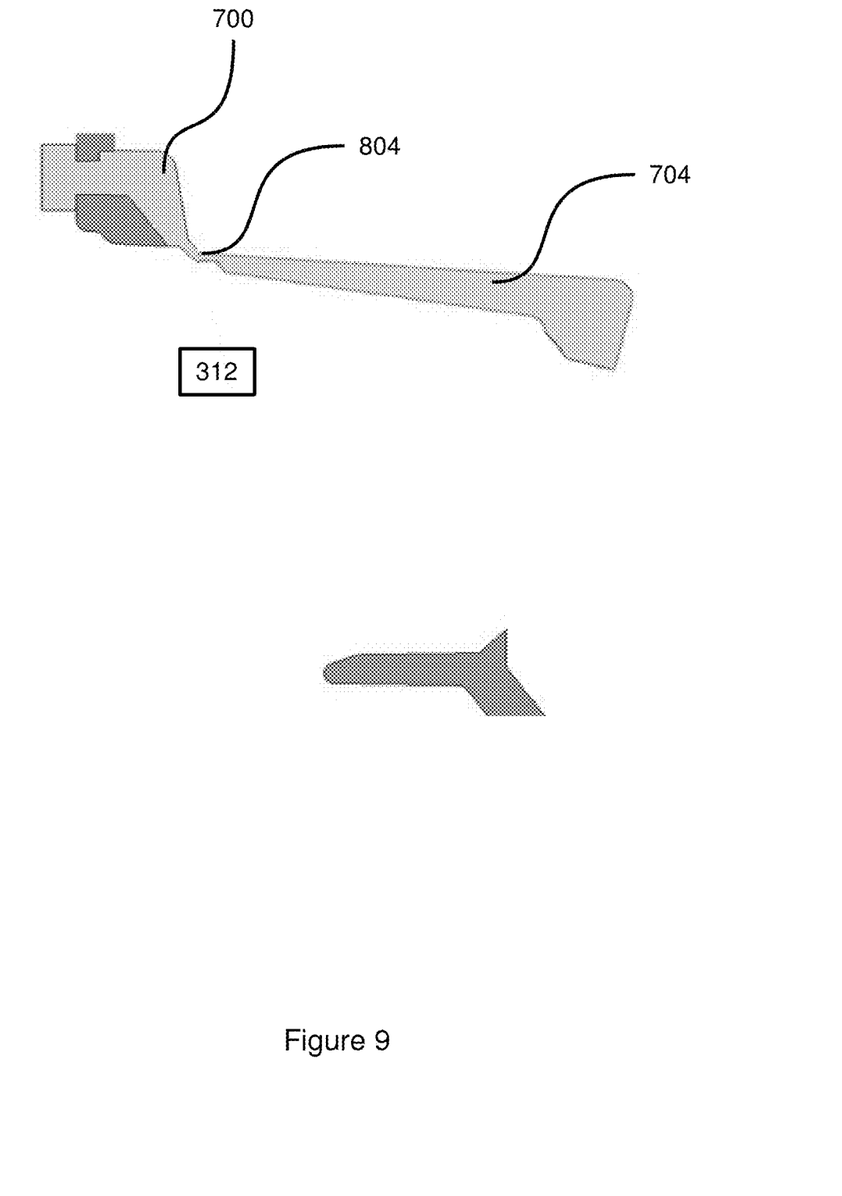
FIG. 9 depicts the partial cross section of FIG. 8 with the vent flap in an open position, according to a non-limiting embodiment.

As seen in FIG. 8, valve flap 704 is in the closed position, and thus covers opening 312. FIG. 9 shows the partial cross section of FIG. 8 with valve flap 704 in an open position, in which opening 312 is uncovered and air is permitted to flow through opening 312. The one-way function of vent 100 is achieved by the structure of valve seat 308—valve seat 308 is shaped to prevent flap 704 from swinging back (i.e. into the vehicle when vent 100 is installed) past valve seat 308. Thus, pressure from the inside of the vehicle can cause flap 704 to open, but pressure from outside the vehicle cannot cause flap 704 to open in the opposite direction. It will now be apparent that the use of non-bondable first and second materials permits valve member 704 to be injection-moulded over frame 200 while permitting valve flaps 704 to open—the use of bondable materials may result in valve flaps 704 chemically bonding to frame 200, preventing them from opening.

The shape of valve seat 308 has an additional function, in ensuring that the integrity of the seal between valve seat 308 and flap 704 is preserved after material shrinkage following the injection process. Referring to FIG. 8, as the material of the second injection shot (which includes valve members 204) cools after moulding, it can shrink. Valve flap 704 may therefore shorten in the direction indicated by arrow 808. As a result of such shortening, a gap may form at 812 between flap 704 and valve seat 308. In order to prevent the seal between flap 704 and valve seat 308, valve seat 308 includes a lip 816 that will remain in contact with even a shortened flap 704. In addition, the shortening of flap 704 and provision of lip 816 can reduce the noise associated with a rapid change in pressure resulting in the violent closing of flap 704. A gap at 812 allows flap 704 to close forcefully without "slapping" valve seat 308.

Returning to FIG. 7, seal member 208 is a one-piece member fixed against outer wall 300 and extending outwardly from outer wall 300. The fixation of seal member 208 to outer wall 300 can be achieved in a manner similar to anchors 800 discussed above. That is, the material used to mould seal member 208 passes through anchor holes 600 on flange 304 during the injection process, and thus prevents seal member 208 from detaching from frame 200 after the plastic has set. As noted earlier in connection with valve member 204, the attachment between frame 200 and seal member 208 is mechanical, as the first and second materials are non-bonding.

Figure 10A:
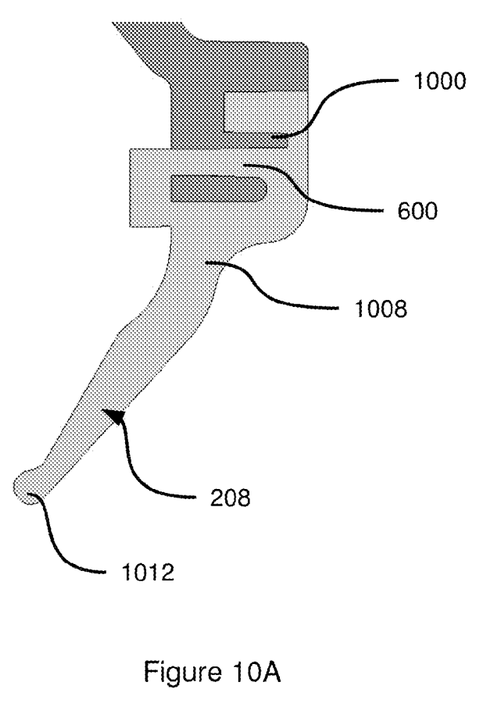
FIGS. 10A and 10B depict partial cross sections of a seal member taken from FIG. 7, according to a non-limiting embodiment.

Other fixation structures can also be used, instead of or in addition to anchor holes 600. For example, convolutions can be provided in flange 304 to provide a mechanical interlock between flange 304 and seal member 208. FIG. 10A depicts a cross section taken at line "B" from FIG. 7. As seen in FIG. 10A, the material forming seal member 208 flows through anchor hole 600 during the moulding operation, and fixes seal member 208 to frame 200. In addition, flange 304 of frame 200 includes a ridge 1000 that increases the surface area in contact between frame 200 and seal member 208. Increased area of contact provides stronger mechanical attachment, and reduces the risk of water or other fluids traversing vent 100 in between seal member 208 and frame 200.

Figure 10B:
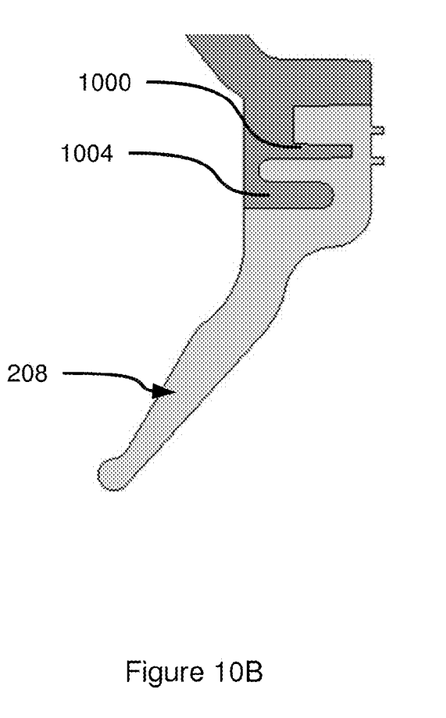

FIG. 10B depicts another embodiment of the cross section of FIG. 10A (the two embodiments can also be combined in a single vent 100). In FIG. 10B, anchor hole 600 is omitted at that particular section of vent 100, and frame 200 is instead provided with a second ridge 1004.

Seal member 208 also has, as seen in FIG. 10A, a cored portion 1008 with a reduced thickness, and a cylindrical edge portion 1012. Seal member 208 extends outwards from frame 200 and is also angled towards the back of vent 100 (corresponding to the interior of the vehicle when vent 100 is installed). As will be seen below, the angling of seal member 208 results in cylindrical portion 1012 contacting panel 104 during the installation of vent 100 and being forced forwards (towards the exterior of the vehicle). Cored portion 1008 and cylindrical portion 1012 permit seal member 208 to flex and slide, respectively, along panel 104 during installation, reducing the likelihood of seal member 208 rolling inwards and negatively affecting the seal.

Figure 11:
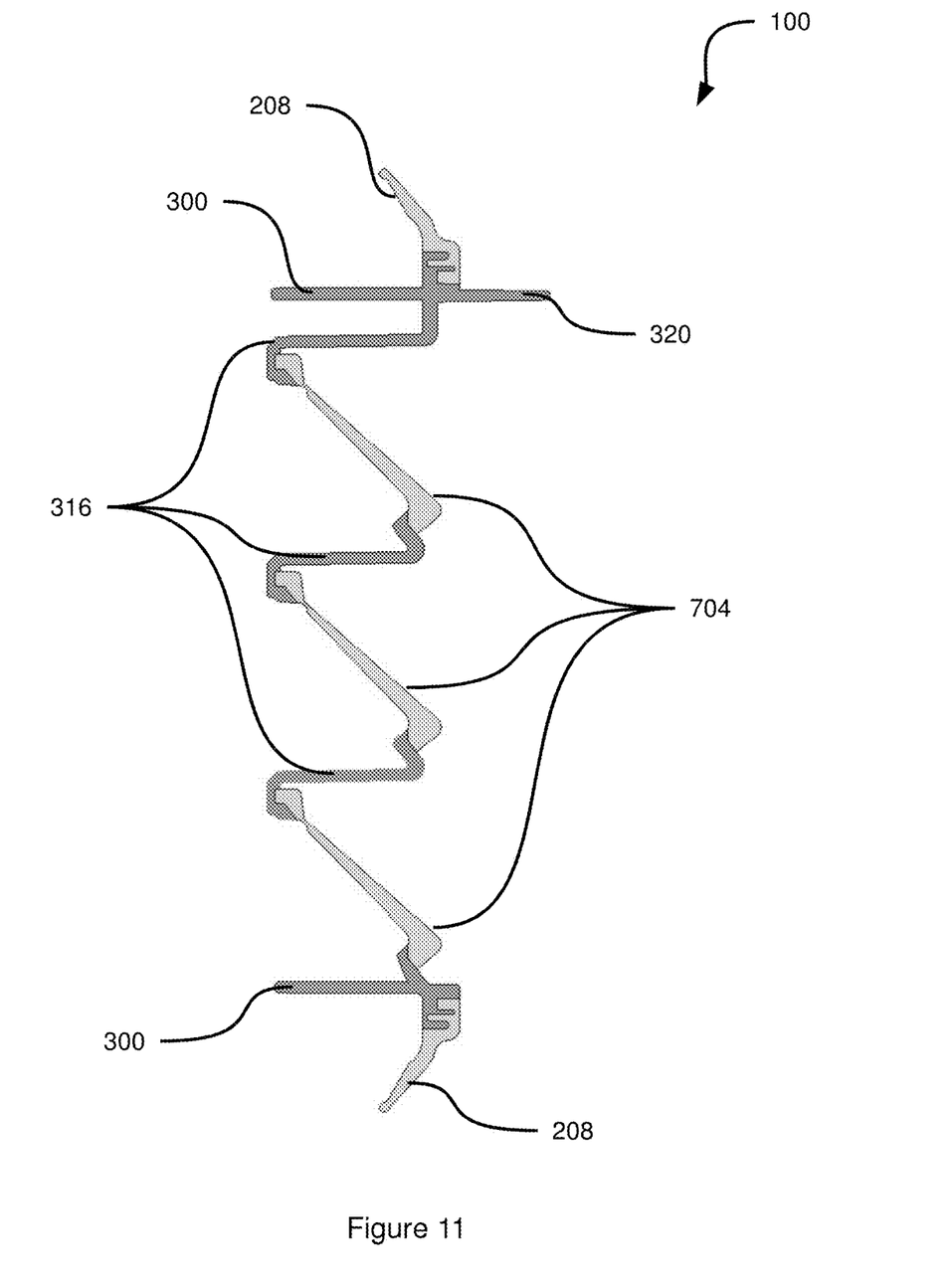
FIG. 11 depicts a cross section of the vent of FIG. 7, according to a non-limiting embodiment.

Referring briefly to FIG. 11, a full cross section of vent 100 is shown, in which three valve flaps 704 are visible, as well as ribs 316, outer wall 300, rain shield 320 and seal member 208.

Figure 12:
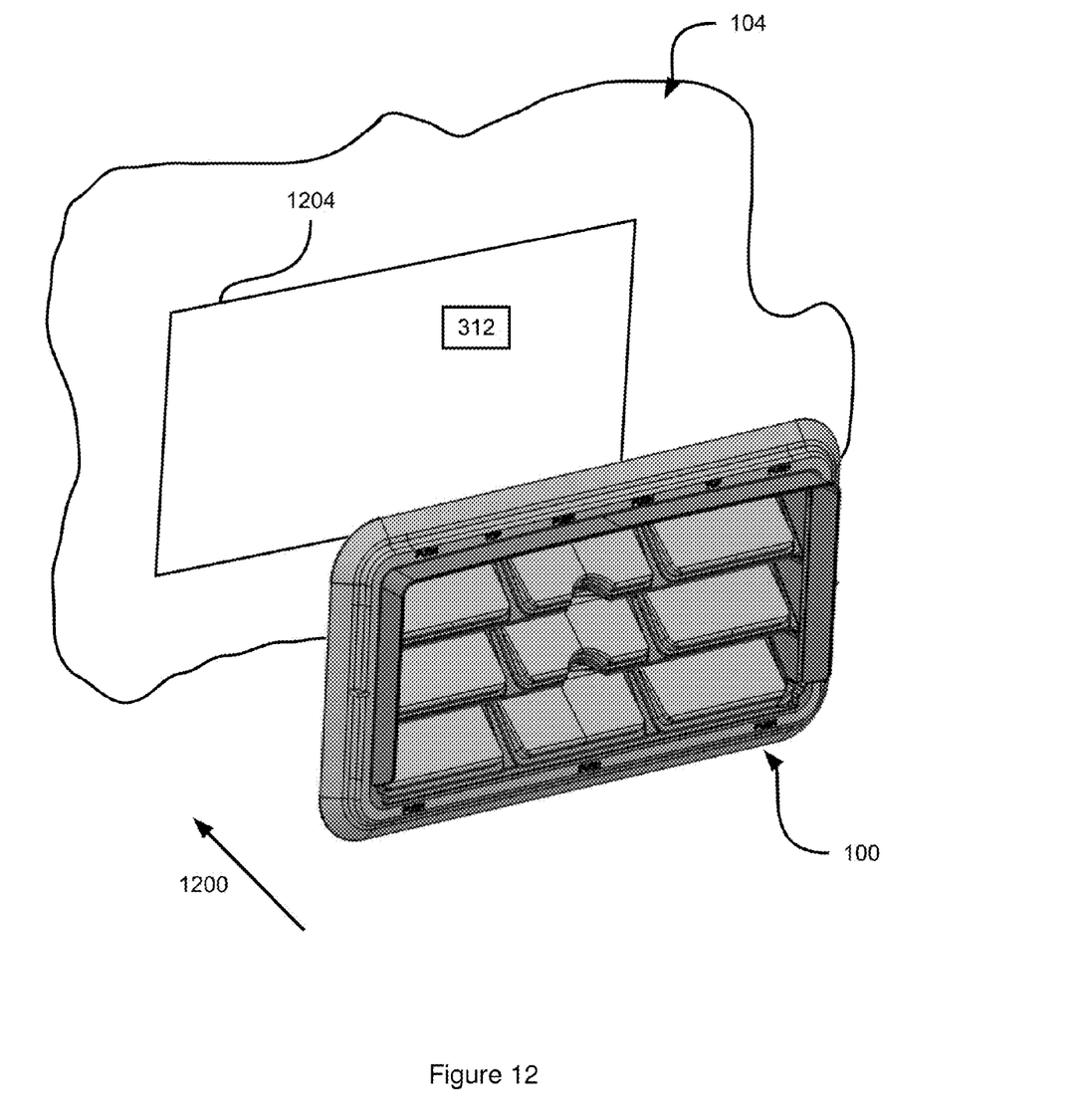
FIG. 12 depicts the vent of FIG. 1 in position for installation, according to a non-limiting embodiment.

Turning now to FIG. 12, the installation of vent 100 (after both injection operations are complete and vent 100 is fully formed) into panel 104 will be discussed. A portion of panel 104 is shown, including aperture 312. To install vent 100 in panel 104, vent 100 is pushed backwards towards aperture 312, in the direction of arrow 1200, with vent flaps 704 in position to open away from aperture 312 and rain shield 320 extending away from aperture 312.

Figure 13A:
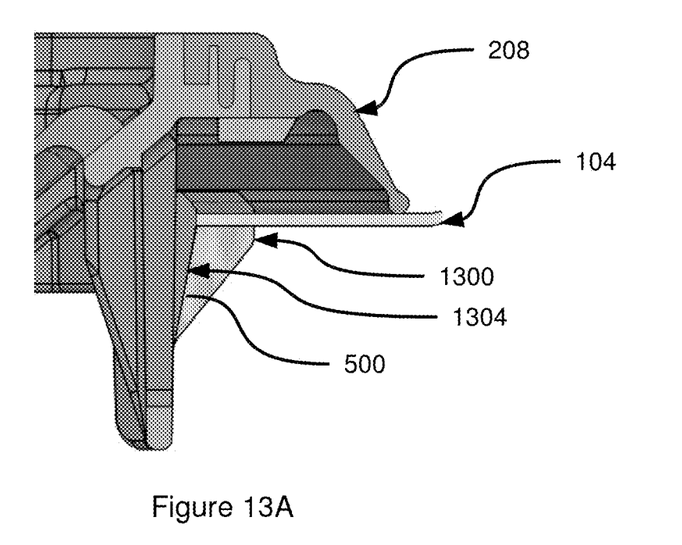
FIGS. 13A and 13B depict partial cross sections of the clip of FIG. 5 during installation of the vent, according to a non-limiting embodiment.
Figure 13B:
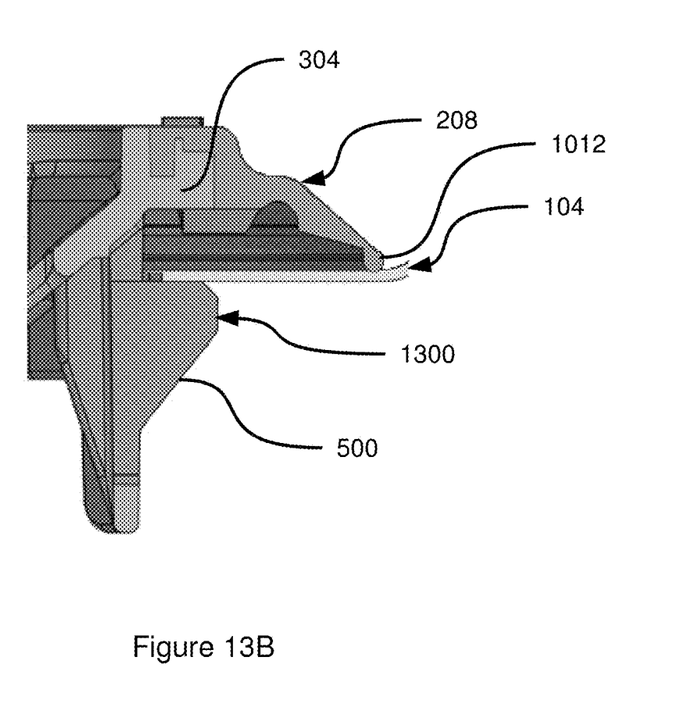

Outer wall 300 will engage a perimeter 1204 of aperture 312. In particular, outer wall 300 is dimensioned to fit within perimeter 1204, but ridges 500 of clips 324 extend out from outer wall 300 sufficiently to contact perimeter 1204. As seen in FIG. 13A, when ridges 500 contact panel 104 as vent 100 is pushed into aperture 312, clips 324 are deformed inwards from an extended position 1300 to a retracted position 1304. As seen in FIG. 13B, once vent 100 has been pushed into aperture 312 a sufficient distance, panel 104 passes an upper surface of clips 324, and no longer exerts inward pressure on ridges 500. As a result, clips 324 return to the extended position, in which their upper surfaces prevent vent 100 from reversing out of aperture 312. As also illustrated in FIG. 13B, seal member 208 deforms upwards and outwards as vent 100 is pushed into aperture 312, with cylindrical portion 1012 pressing against panel 104 to form a seal.

Figure 14:
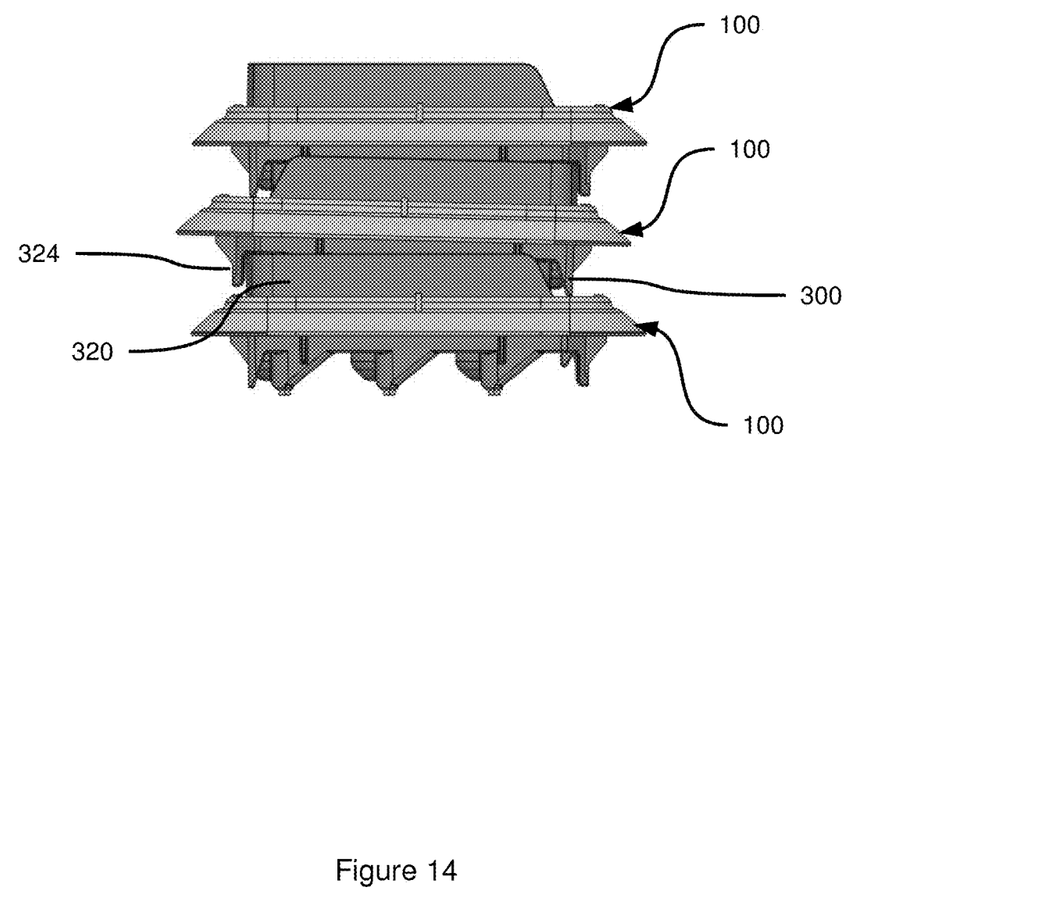
FIG. 14 depicts a stack of three vents, according to a non-limiting embodiment.

In some embodiments, vent 100 can be provided with additional features that aid in the transportation and storage of multiple vents 100. FIG. 14 illustrates three vents 100 stacked on top of one another. Each vent 100 is dimensioned such that the clips 324 of an upper vent 100 in the stack hook over the rain shield 320 of the next vent 100 down the stack. Lateral motion between vents 100 is thus reduced. In addition, a portion of outer wall 300 of the upper vent 100 rests on the frame of the lower vent 100. Frame 200 can include a flat area on a front surface thereof to support an outer wall 300 of another vent 100, to prevent the other vent 100 from resting on vent flaps 704 or seal member 208 (which may degrade the performance of the vents and seal over time). Such an area is visible in the lower right-hand and lower left-hand corners of frame 200 in FIG. 7.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A one-way vent, comprising:
   a frame made of a first plastic by a first injection moulding operation of a two-shot injection moulding process, the frame including:
      an outer wall for engaging a perimeter of a vehicle body panel aperture;
      a valve seat extending inwardly from the outer wall, the valve seat defining an opening through the frame;
   a valve member made of a second plastic having a lower stiffness than the first plastic, the valve member including:
      a flap support fixed against a portion of the valve seat; and
      a valve flap flexibly coupled to the flap support and moveable between a closed position resting on the valve seat to cover the opening, and an open position elevated from the valve seat to uncover the opening; and
   a seal member made of the second plastic, fixed against the outer wall of the frame and extending outwardly from the outer wall;
   the valve member and the seal member being formed over the frame by a second injection moulding operation of the two-shot moulding process.

2. The one-way vent of claim 1, the frame having a plurality of anchor holes defined therein: each of the valve member and the seal member having anchors extending through respective anchor holes.

3. The one-way vent of claim 1, the outer wall including a plurality of flexible clips for fastening the vent to the perimeter of the aperture.

4. The one-way vent of claim 1, comprising a plurality of valve members each having a plurality of vent flaps supported by a single flap support.

5. The one-way vent of claim 4, the frame further having a plurality of ribs extending inwardly from the outer wall and arranged in a grid, the ribs providing a plurality of valve seats.

6. The one-way vent of claim 1, the frame further having a rain shield extending forwards from the outer wall.

7. The one-way vent of claim 1, the frame having four sides and the rain shield extending forwards from the outer wall on only three of the four sides.

8. The one-way vent of claim 1, wherein the first and second materials do not form chemical bonds.

9. The one-way vent of claim 1, wherein the valve flap is coupled to the flap support by a living hinge.

10. The one-way vent of claim 1, wherein the seal member includes a cored portion of reduced thickness, and includes a cylindrical edge portion.

\* \* \* \* \*